US007978171B2

(12) United States Patent
Wu et al.

(10) Patent No.: US 7,978,171 B2
(45) Date of Patent: Jul. 12, 2011

(54) CONTROL CIRCUIT OF AREA CONTROL DRIVING CIRCUIT FOR LED LIGHT SOURCE AND CONTROLLING METHOD THEREOF

(75) Inventors: Tsai-Fu Wu, Hsinchu (TW); Chang-Yu Wu, Hsinchu (TW); Chin-Feng Kang, Hsinchu (TW); Che-Yi Su, Hsinchu (TW)

(73) Assignee: Analog Integrations Corporation, Hsinchu (TW)

( * ) Notice: Subject to any disclaimer, the term of this patent is extended or adjusted under 35 U.S.C. 154(b) by 978 days.

(21) Appl. No.: 11/850,716

(22) Filed: Sep. 6, 2007

(65) Prior Publication Data

US 2008/0284714 A1 Nov. 20, 2008

(30) Foreign Application Priority Data

May 15, 2007 (TW) ............................... 96117279 A

(51) Int. Cl.

| | |
|---|---|
| ***G09G 3/36*** | (2006.01) |
| ***G06F 3/038*** | (2006.01) |
| ***G05F 1/00*** | (2006.01) |
| ***H05B 37/00*** | (2006.01) |
| ***G09F 13/04*** | (2006.01) |

(52) U.S. Cl. ........ 345/102; 345/212; 315/291; 315/312; 362/97.3

(58) Field of Classification Search .............. 345/82–84, 345/87–103, 204, 211–214, 690; 315/291, 315/294, 299, 312, 323–324; 313/498, 500; 362/97.1–97.3, 249.01–249.02; 363/89
See application file for complete search history.

(56) References Cited

U.S. PATENT DOCUMENTS

| | | | | |
|---|---|---|---|---|
| 6,329,758 | B1 * | 12/2001 | Salam | 315/169.2 |
| 7,777,704 | B2 * | 8/2010 | S et al. | 345/82 |
| 7,847,783 | B2 * | 12/2010 | Liu et al. | 345/102 |
| 2007/0176883 | A1 * | 8/2007 | Hsu et al. | 345/102 |
| 2007/0229001 | A1 * | 10/2007 | McIntosh et al. | 315/307 |
| 2008/0106216 | A1 * | 5/2008 | Yu et al. | 315/247 |

* cited by examiner

*Primary Examiner* — Bipin Shalwala
*Assistant Examiner* — Keith Crawley
(74) *Attorney, Agent, or Firm* — Gottlieb, Rackman & Reisman, P.C.

(57) ABSTRACT

A control circuit of a driving circuit for controlling a light emitting diode (LED) light source having a plurality of areas is provided. The control circuit includes the error amplifiers receiving a feed back current signal and a external reference voltage, and generating an error signal; a buffer register receiving a serial digital signal and generating the parallel digital signals; a work register receiving the parallel digital signals and a trigger signal, and outputting the parallel digital signals when the trigger signal is at a relatively high level; and a switch module having the power switches, each of which receives the error signal and the parallel digital signal for generating a driving signal to control a driving current of a specific area of the light source, in order to control the brightness in each area of the LED light source.

6 Claims, 12 Drawing Sheets

CONTROL CIRCUIT OF AREA CONTROL DRIVING CIRCUIT FOR LED LIGHT SOURCE AND CONTROLLING METHOD THEREOF

FIELD OF THE INVENTION

The present invention relates to a control circuit of an area control driving circuit for a light emitting diode (LED) light source and a controlling method thereof. In particular, the present invention relates to a control circuit of an area control driving circuit for a LED light source of a liquid crystal display (LCD) panel and a controlling method thereof.

BACKGROUND OF THE INVENTION

Displays are applied abundantly in the daily life accompanying with the technology development, especially in the LCD. Since the liquid crystal molecule is a non-self-luminous substance, the function of display is achieved by the light supplied by the backlight module. At present, the cold cathode fluorescent lamp (CCFL) is commonly applied as the light source of the backlight module, and is cooperated with the structures, such as the liquid crystal molecule and the color filter, etc., to display the color image. However, comparing with the CCFL, the advantages of using LED array as the LCD backlight source lies in: (a) fast reaction rate, (b) long life-span, (c) without high-voltage lighting, (d) without mercury, no environmental pollution problem, and (e) wider color range. At present, although many companies make effort at developing CCFL with low mercury and wider color range, the reaction rate of the CCFL is the uneasily improvable disadvantage. Therefore, using LED as the LCD backlight source must be the developmental trend in the future. Nowadays, a novel display technology, area control or regional control, needs the backlight source of fast reaction rate in order to increase the contrast ratio of light and shade of the display. The emitting mode of the area control is described below.

In the traditional display technology, the brightness of the backlight lamps are identical, and the degree of light and shade of the screen is controlled by the tilted angles of the liquid crystal molecules. However, the method can't avoid the phenomenon of light leak. The screen is sectionalized into several areas by the area control, and the brightness of the backlight source is adjusted according to individual degree of light and shade. The backlight lamp with darker area of the screen is adjusted to darkness in order to decrease the phenomenon of light leak; therefore, the contrast ratio of light and shade of the display is increased enormously, and the power consumption of the backlight lamp is decreased at the same time. If the area control display technology are adopted, the speed of response of the backlight lamp must be increased as fast as possible so as to shorten the transient time and then increase the accuracy of the brightness. Therefore, the LED is very suitable for the backlight source of the area control display technology.

The color light mixing with the red, green and blue light LED arrays has a better scope of the color display. And, a display technology named sequential color display (SCD) method had been developed in recent years, the red, green and blue lights are sequentially generated by the backlight lamps. The colored screen is showed by the panel without cooperating with the color filter, and the power and the cost are decreased enormously. The control integrated circuit (IC) of the area control driving circuit of the present invention is cooperated with the single-set white LED backlight lamp, or cooperated with the LED backlight lamp of the red, green, and blue lights, and the LED backlight lamp of the sequential color display method.

Please refer to FIG. 1, which is a circuit diagram showing an area control driving circuit of the LED backlight lamp according to the prior art. It is configured by the backlight module 100 and the control center 700. Due to achieving the area control of the backlight lamp, the backlight lamps in each area must be controlled individually. The most straightforward method is increasing the numbers of the driver (including the driver A, B, C and D in FIG. 1). According to the driving signals (the driving signal A, B, C and D in FIG. 1) provided by the control center 700, the single area LED array is lightened up by single driver, and the brightness in each area is controlled accurately. However, the volume, weight and cost of the system are increased enormously by the method thereof.

Please refer to FIG. 2, which is a circuit diagram showing another area control driving circuit of the LED backlight lamp according to the prior art. It is configured by the backlight module 100, the control center 700, and an additional independent driver 300. The difference between FIG. 2 and FIG. 1 lies in that the backlight lamp in each area serially connected to an active power switch (including the switch A, B, C and D in FIG. 2) is only needed. According to the signals (the driving signal A, B, C and D in FIG. 2) provided by the control center 700, the pulse width modulation (PWM) control is achieved individually by each active power switch in order to realize the emitting method of the area control. The active power switch is substituted for the drivers in each area, and the volume, weight and cost of the system must be decreased. However, the impedance of each LED has some differences. Therefore, if the area control is achieved by the driving method, the driving currents of each LED array are not identical. At present, each active power switch serially connected to a linear regulator (not shown) is the general solution in order to achieve the function of stabilizing current. However, too much electricity power are consumed by the linear regulator and the systematic efficiency is decreased.

It is therefore attempted by the applicant to deal with the above situation encountered in the prior art.

SUMMARY OF THE INVENTION

According to one aspect of the present invention, a control circuit of a driving circuit for controlling a light emitting diode (LED) light source having a plurality of areas is provided. The control circuit comprises a plurality of error amplifiers, each of which receives a feedback current signal outputted from a specific area of the light source and an external reference voltage for generating an error signal; a buffer register receiving a serial digital signal, and generating a plurality of parallel digital signals; a work register receiving the plurality of parallel digital signals and a trigger signal, and outputting the plurality of parallel digital signals when the trigger signal is at a relatively high level; and a switch module having a plurality of power switches and coupled to the work register, each of the power switches receives a specific one of the error signals and a specific one of the parallel digital signals for generating a driving signal to control a driving current of a specific area of the light source, in order to control the brightness in each area of the LED light source.

Preferably, the switch module is an analog switch module, and the light source is selected from a group consisting of a backlight module of a liquid crystal display (LCD) screen, an outdoor screen, an indoor illuminating system, an outdoor illuminating system and a signal lamp.

Preferably, the light source is the backlight module, and the driving circuit further comprises a control center generating the serial digital signal, a driver generating the driving current, and an LED array module having a plurality of LED arrays, each of which comprises an LED series having a plurality of LEDs, a first end coupled to the driver and a second end; an active power switch controlling a current of the LED series and comprising a first end coupled to the second end of the LED series, a second end, and a control end receiving a specific one of the driving signals; a current detecting resistor detecting a standard value of a specific one of the driving currents passing through the LED series, comprising a first end coupled to the second end of the active power switch, and a second end coupled to a ground; an active switch protecting circuit comprising a first voltage-divided resistor having a first end coupled to the first end of the current detecting resistor and a second end outputting a specific one of the feedback current signals, a silicon controlled rectifier (SCR) having an anode receiving a power voltage, a cathode coupled to the second end of the first voltage-divided resistor and a gate electrode, a zener diode having an anode coupled to the gate electrode of the silicon controlled rectifier and a cathode, a negative temperature coefficient (NTC) resistor having a first end coupled to the anode of the silicon controlled rectifier and a second end coupled to the cathode of the zener diode; and a second voltage-divided resistor having a first end coupled to the cathode of the zener diode and a second end coupled to the ground, wherein when a temperature of the active power switch is higher than a predetermined temperature, the active power switch will be turned off, and each of the driving currents drives a specific one of the areas of the light source for emitting a light.

Preferably, the backlight module is selected from a group consisting of a single-set white light LED backlight lamp, an LED backlight lamp comprising a red, a green and a blue backlight lamps, and an LED backlight lamp of a sequential color display method.

Preferably, the control circuit is an integrated circuit controlling the LED light source, and further comprises a plurality of feedback current signal input ports, each of which receives a specific feedback current signal; a reference voltage input port receiving a reference voltage; an enable signal input port receiving an enable signal; an alarm signal output port outputting an alarm signal indicating a failure; a serial bus interface digital signal input port receiving the serial digital signal; a synchronizing signal input port receiving a synchronizing signal synchronizing the light source and the control circuit; a serial bus interface digital signal output port outputting a datum from the digital signal output port when a number of the datum inputted into the serial bus interface digital signal output port is larger than a predetermined value; a trigger signal input port receiving the trigger signal; a plurality of driving signal output ports, each of which outputs a specific driving signal of the active power switch; a grounding port coupled to a ground; and a voltage input port receiving a supply voltage.

Preferably, each of the power switches is an analog gate switch.

According to another aspect of the present invention, a control circuit of a driving circuit for controlling an LED light source having a plurality of areas is provided. The control circuit comprises a buffer register receiving a serial digital signal outputted from the driving circuit for generating a plurality of parallel digital signals; a work register receiving the plurality of parallel digital signals and a trigger signal, and outputting the plurality of parallel digital signals when the trigger signal is at a relatively high level; and an error amplifier module receiving a plurality of feedback current signals outputted from the respective areas of the light source and an external reference voltage for generating a plurality of driving signals, in order to control a brightness in each area of the LED light source, the module comprising an error amplifier receiving a specific one of the feedback current signals and the reference voltage for generating an error signal; and a switch coupled to the work register and receiving the error signal and a specific one of the parallel digital signals for generating the driving signal.

According to a further aspect of the present invention, an driving circuit of an LED light source is provided. The driving circuit comprises a control center generating a serial bus interface digital signal; a control circuit module receiving the serial bus interface digital signal, a plurality of feedback current signals and an external reference voltage for generating a plurality of driving signals; and an LED array module having a plurality of LED arrays, each of which receives a specific one of the driving signals for controlling a driving current of a specific area of the light source, in order to control a brightness in the specific area of the LED light source, wherein each of the feedback current signals is outputted from a specific one of the LED arrays.

Preferably, the driving circuit further comprises a driver coupled to each of the LED arrays, wherein the control circuit module comprises the above integrated circuit, the light source is a single-set white light LED backlight lamp, the LED array module is a single-set white light LED array, and the array is driven by the driver in order to emit a white light.

Preferably, the serial bus interface digital signal comprises a red light serial digital signal, a green light serial digital signal and a blue light serial digital signal, the LED array module comprises a red light LED array having a plurality of subarrays, a green light LED array having a plurality of subarrays and a blue light LED array having a plurality of subarrays, and the control circuit module comprises a first control circuit receiving the red light serial digital signal, the feedback current signals outputted from the subarrays of the red light LED array and the external reference voltage for generating a plurality of first driving signals to drive the subarrays of the red light LED array; a second control circuit receiving the green light serial digital signal, the feedback current signals outputted from the subarrays of the green light LED array and the external reference voltage for generating a plurality of second driving signals to drive the subarrays of the green light LED array; and a third control circuit receiving the blue light serial digital signal, the feedback current signals outputted from the subarrays of the blue light LED array and the external reference voltage for generating a plurality of third driving signals to drive the subarrays of the blue light LED array, wherein each of the first, second and third control circuits is an integrated circuit according to claim 5.

Preferably, the driving circuit further comprises a driver coupled to each of the subarrays, wherein the light source is the backlight lamp of a red-green-blue light LED sequential color display method, the array module is an LED array of a sequential color display method, and the red light LED array, the green light LED array and the blue light LED array are driven by the driver with a sequential color display method to emit a red light, a green light and a blue light in sequence.

Preferably, the driving circuit further comprises a first driver coupled to each of the subarrays and receiving the first driving signal for driving the red light LED array to emit a red light; a second driver coupled to each of the subarrays and receiving the second driving signal for driving the green light LED array to emit a green light; and a third driver coupled to each of the subarrays and receiving the third driving signal for driving the blue light LED array to emit a blue light, wherein the light source is an LED backlight lamp comprising a red, a green and a blue backlight lamps, the LED array is an LED array emitting a color light mixed with the red, green and blue light, and the light source emits a light mixed with the red, green and blue light.

Preferably, the driving circuit is used for driving an LED backlight module of a liquid crystal display panel.

According to a further aspect of the present invention, a control method for controlling a driving circuit of an LED backlight lamp having a plurality of areas is provided. The driving circuit comprises a control center, an LED array module having a plurality of LED array and a control circuit module, the method comprising the steps of: (a) generating a serial bus interface digital signal; (b) generating a plurality of feedback circuit signals; (c) receiving the serial bus interface digital signal, the feedback circuit signals, an external synchronizing signal and a trigger signal for generating the plurality of driving signals; and (d) controlling a driving circuit of a specific one of the LED arrays according to each of the driving signals for controlling a brightness in each area of the LED light source.

Preferably, the driving circuit further comprises a driver, the control circuit module comprises a control circuit, the light source is a single-set white light LED backlight lamp, the LED array module comprises a plurality of single-set white light LED arrays, each of the arrays has a switch, and the step (d) further comprise the steps of: (d1) outputting each of the driving signals to a specific one of the arrays; (d2) turning on/off the switch of a specific one of the arrays according to the respective driving signal to control the driving circuit of the array; and (d3) driving each of the arrays in accordance with the respective driving circuit, so that a specific area of the light source corresponding to each of the arrays has a specific brightness.

Preferably, the serial bus interface digital signal comprises a red light serial digital signal, a green light serial digital signal and a blue light serial digital signal, the driving circuit further comprises a first driver, a second driver and a third driver, the array module comprises a red light LED array having a plurality of subarrays, a green light LED array having a plurality of subarrays and a blue light LED array having a plurality of subarrays, the control circuit module comprises a first control circuit, a second control circuit and a third control circuit, and the step (c) further comprises the steps of: (c1) receiving the red light serial digital signal, the plurality of feedback circuit signals outputted from the subarray of the red light LED array and an external reference voltage by the first control circuit for generating the plurality of first driving signals to drive the subarrays of the red light LED array; (c2) receiving the green light serial digital signal, the plurality of feedback circuit signals outputted from the subarray of the green light LED array and an external reference voltage by the second control circuit for generating the plurality of second driving signals to drive the subarrays of the green light LED array; and (c3) receiving the blue light serial digital signal, the plurality of feedback circuit signals outputted from the subarray of the blue light LED array and an external reference voltage by the third control circuit for generating the plurality of third driving signals to drive the subarrays of the blue light LED array.

Preferably, the driving circuit further comprises a driver coupled to each of the subarrays of the red light LED array, the green light LED array and the blue light LED array, wherein the light source is a backlight lamp of a red-green-blue light LED sequential color display method, the array module is an LED array of a sequential color display method, and the step (d) further comprises a step of: (d1) driving each of the subarrays of the red light LED array, the green light LED array and the blue light LED array by the driver, so that a red light, a green light and a blue light are emitted by the sequential color display method in sequence for generating the color light from the light source.

Preferably, the driving circuit further comprises a first driver coupled to each of the subarrays of the red light LED array, a second driver coupled to each of the subarrays of the green light LED array, and a third driver coupled to each of the subarrays of the blue light LED array, the light source is a backlight lamp comprising a red, a green and a blue backlight lamps, and the step (d) further comprises the steps of: (d1) driving the red light LED array for emitting a red light; (d2) driving the green light LED array for emitting a green light; (d3) driving the blue light LED array for emitting a blue light; and (d4) mixing the red light, green light and blue light emitted from red light, green light and blue light LED arrays for generating a color light.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
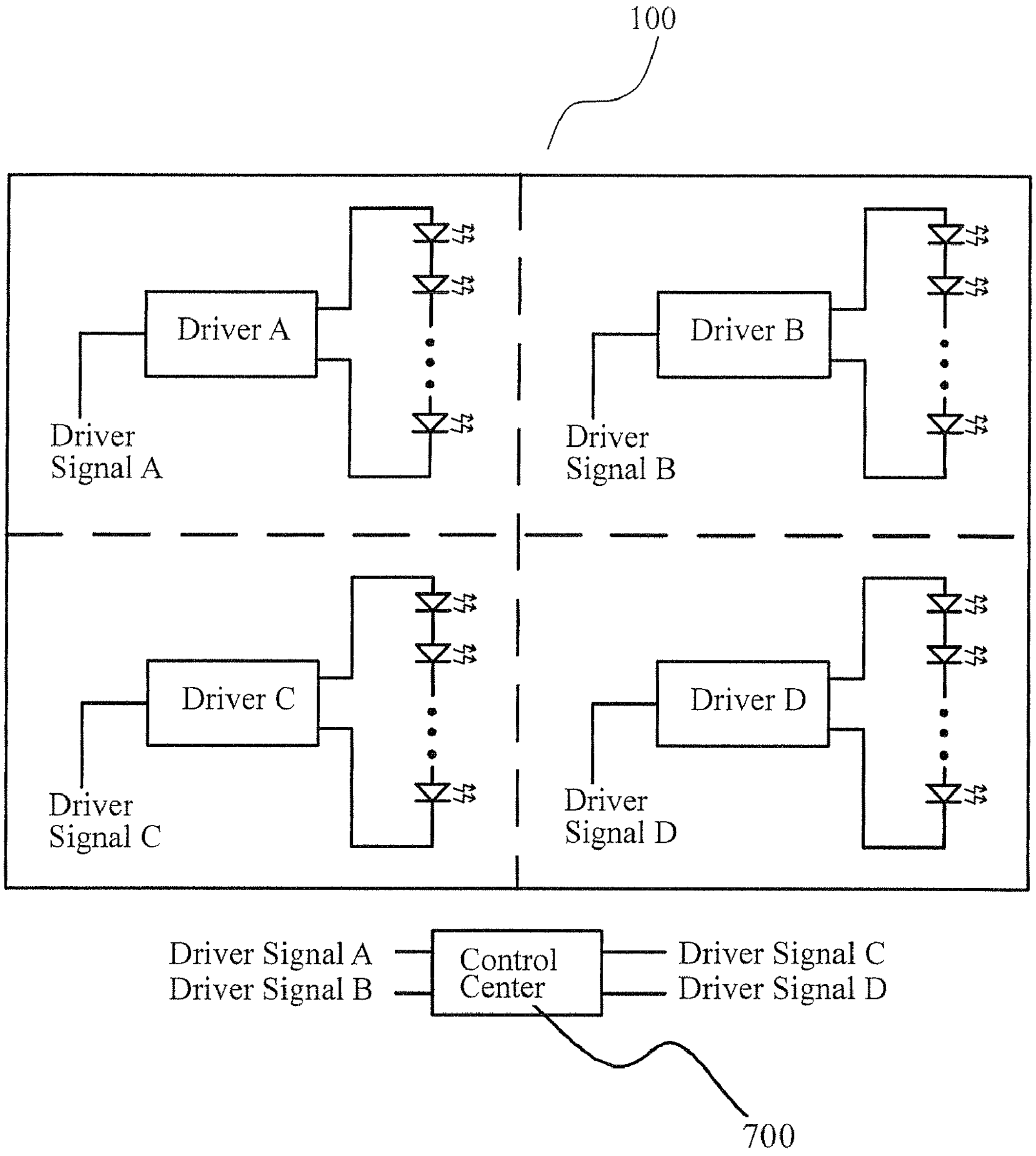
Fig. 1(PRIOR ART)
FIG. 1 is a circuit diagram showing an area control driving circuit of the LED backlight lamp according to the prior art.
Figure 2:
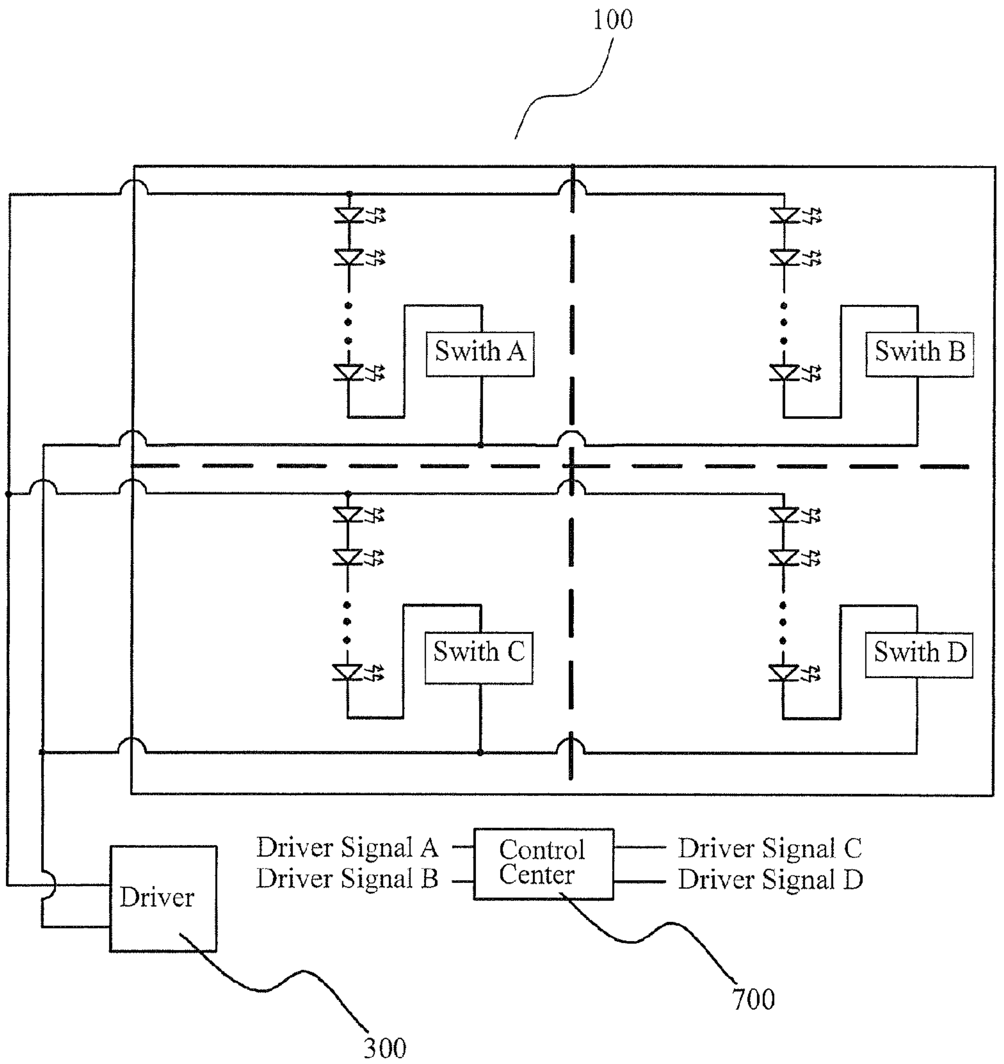
Fig. 2(PRIOR ART)
FIG. 2 is a circuit diagram showing another area control driving circuit of the LED backlight lamp according to the prior art.
Figure 3A:
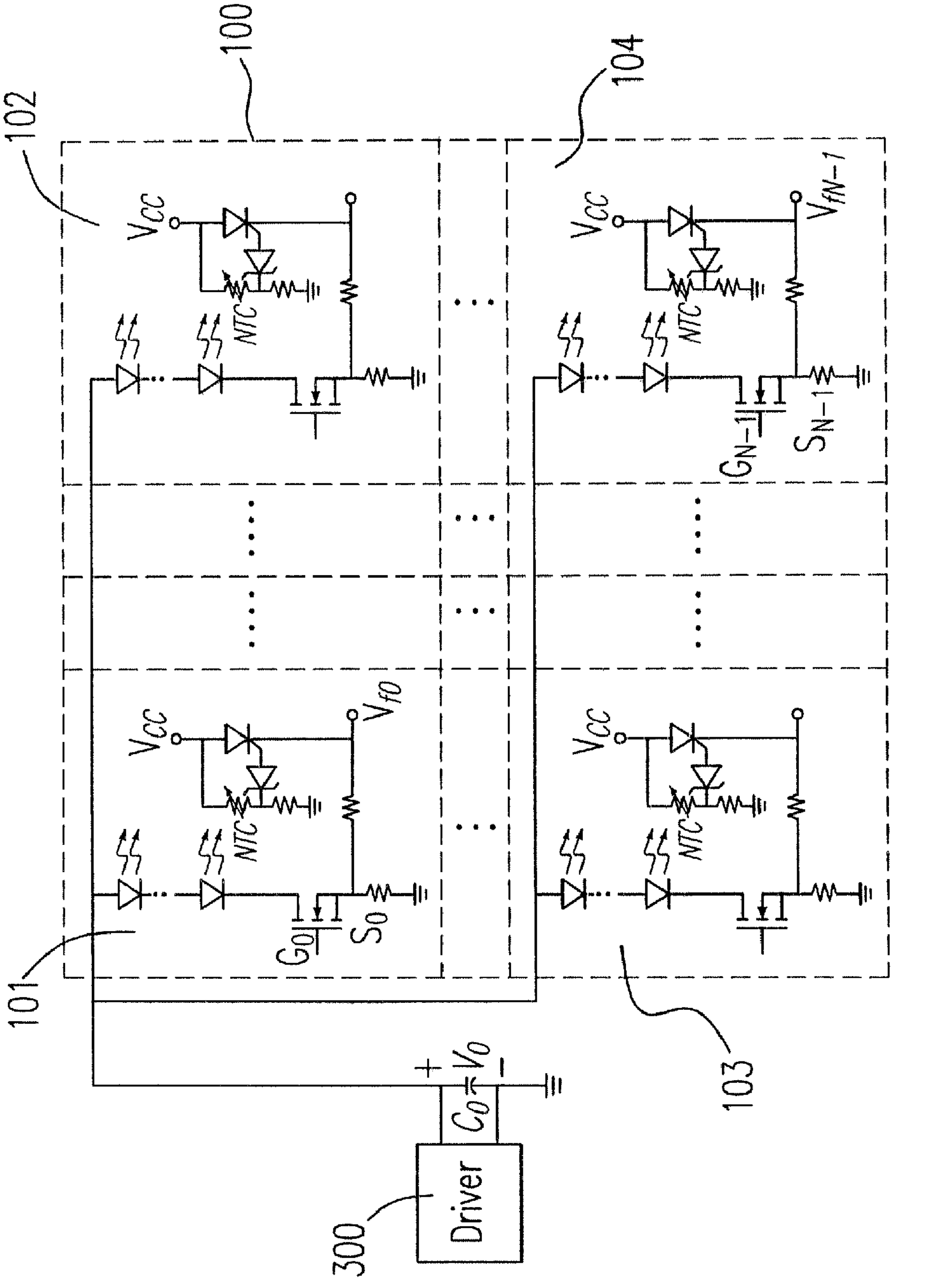
FIG. 3 is a circuit diagram showing an area control driving circuit of the white LED backlight lamp according to the present invention.
Figure 3B:
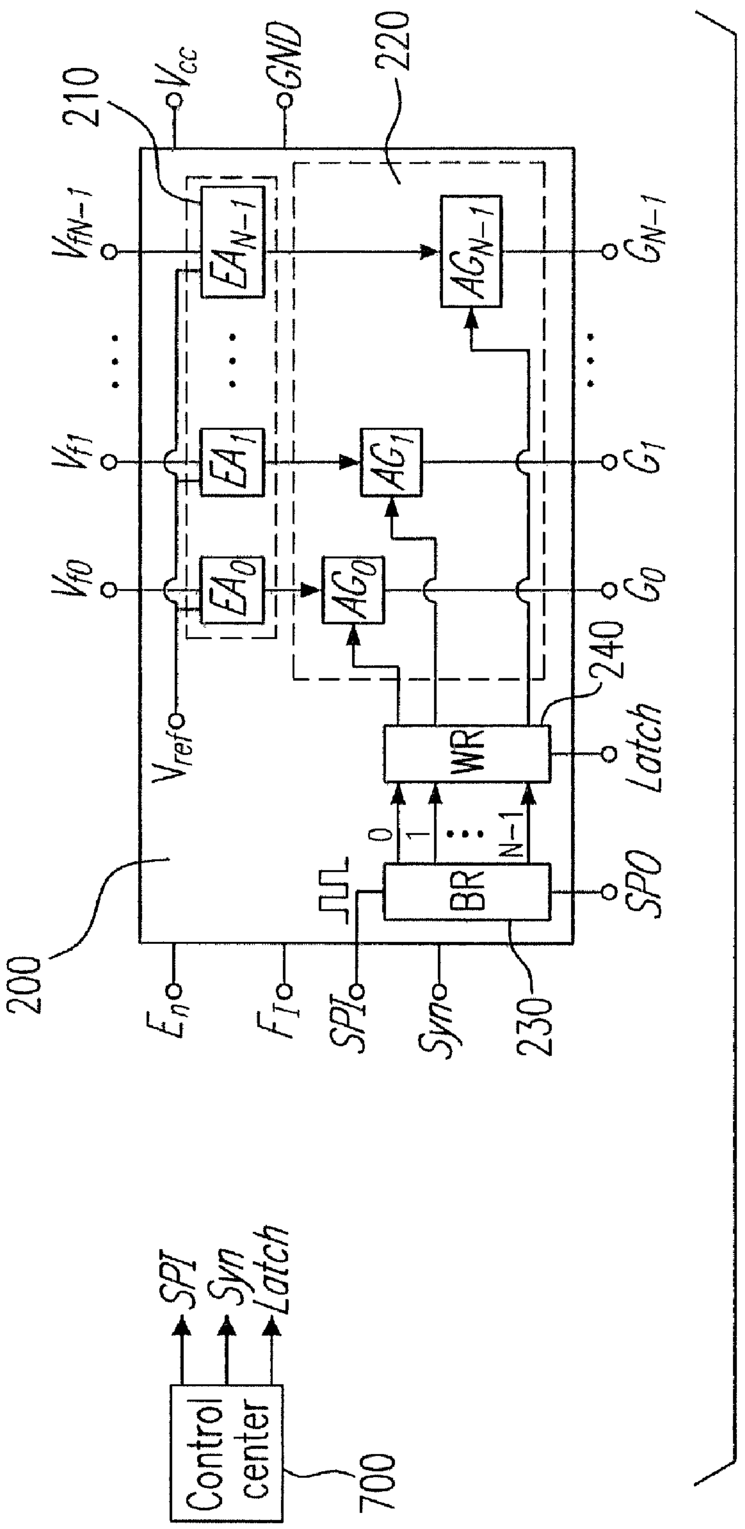

Please refer to FIG. 3, which is a circuit diagram showing an area control driving circuit of the white LED backlight lamp according to the present invention. The driving system is configured by the backlight module 100, the control center 700, the control IC 200 and the driver 300, wherein the control center 700 outputs a serial digital signal to a serial port interface digital signal input port SPI of the control IC 200 of the area control driving circuit, a synchronizing signal is inputted into a synchronizing signal input port Syn of the control IC 200 of the area control driving circuit, and a trigger signal is inputted into a trigger signal input port Latch of the control IC 200 of the area control driving circuit. The backlight module 100 can be sectionalized into N areas, the backlight lamps in each area are configured by the LED array (N white light LED arrays, such as 101, 102, 103 . . . and 104, etc. in FIG. 3), the power switch $S_N$ (including N power switches, such as $S_0$, $S_1$, $S_3$ and $S_{N-1}$, etc. in FIG. 3) and the current sensing resistor $R_{SN}$ (referring to N current sensing resistors, such as $R_{S0}$, $R_{S1}$, $R_{S2}$ . . . and $R_{SN-1}$ in FIG. 3). The framework of the driving IC 200 is mainly configured by the error amplifier module 210 (including N error amplifiers, such as $EA_0$, $EA_1$, $EA_2$ . . . and $EA_{N-1}$ in FIG. 3), the switch module 220 (including N analog gate switches, such as $G_0$, $G_1$, $G_2$ . . . and $G_{N-1}$ in FIG. 3), the buffer register 230 (including N output ports of the buffer registers, such as 0, 1, 2 . . . and N−1 in FIG. 3) and the working register 240, wherein the pins ($V_{f0}$, $V_{f1}$ . . . and $V_{fN-1}$) are the feedback current signals input ports of the LED arrays (the zero, first . . . and the N−1 one) respectively, the pins ($G_0$, $G_1$ . . . and $G_{N-1}$) are serially connected to the driving signal output ports of the active power switches ($S_0$, $S_1$ . . . and $S_{N-1}$) of the LED arrays (the zero, first . . . and the N−1 one) respectively, the pin Syn is the synchronizing signal input port, the pin Latch is the trigger signal input port, the pin SPI is the serial port interface digital signal input port, the pin SPO is the serial port interface digital signal output port, the pin $E_n$ is the enable signal input port, pin $F_1$ is the alarm signal output port, the pin $V_{cc}$ is the supply voltage input port, and the pin GND is the grounding port. Although N channels are the example of the present invention, they can be increased to the numbers of the channel for user's demand. Each function block in the control ICs of the area control driving circuit of the prevent invention is described below.

The feedback current signals ($V_{f0}$, $V_{f1}$ . . . and $V_{fN-1}$) detected from the LED array and the current reference signal $V_{ref}$ are error-amplified through the error amplifier 210, and the error value is the input port of the analog gate switch 220. The serial port interface digital signal input port SPI is responsible for receiving a series of the serial digital signals provided by the control center 700. The serial digital signals are transferred to N parallel output digital signals by the buffer register 230, and then transmitted into the working register 240. When the trigger signal Latch is at the relatively high level, the signal is outputted to the analog gate switch 220 by the working register 240, in order to control the turn-on time of the analog gate switch 220 individually. The voltage signal of the output port of the analog gate switch 220 is equal to the analog voltage value of the input port thereof, i.e. the output voltage of the error amplifier 210. Therefore, the analog voltage values of the driving signals ($G_0$, $G_1$ . . . and $G_{N-1}$) of the active power switches ($S_0$, $S_1$ . . . and $S_{N-1}$) are determined indirectly by the output voltage of the error amplifier 210, and the turn-on time is determined by the signals provided by the control center 700.

Due to some differences of the impedance in each LED, if each white light LED array is driven by the fixed voltage source, the current of each LED array will not be identical. The active power switches ($S_0$, $S_1$ . . . and $S_{N-1}$) of the present invention are used to adjust the current of each LED array. In the normal condition, the active power switch is operated in the saturation region. However, when the current of each LED array is inaccurate, such as the short circuit due to the single LED breakage, and the inconsistent impendence, the active power switch is operated in the linear region. The equivalent impedance is changed by adjusting the gate electrode driving voltage ($G_0$, $G_1$ . . . and $G_{N-1}$), the active power switch is responsible for the energy exhausted originally by the LED, and further controlling the current of each white light LED array accurately. The standard value of the driving current is determined by the current detecting resistor ($R_{S0}$, $R_{S1}$ . . . and $R_{SN-1}$) (please refer to FIG. 3); therefore, the driving system of the present invention can be cooperated with LEDs of different brands and different powers. In order to avoid burning out the active power switch due to the highly consumed power, the active power switch is connected in parallel to a protecting circuit configured by the negative temperature coefficient (NTC) thermal resistor, the voltage-divided resistor ($R_{10}$, $R_{20}$; $R_{11}$, $R_{21}$; . . . and $R_{1N-1}$, $R_{2N-1}$), the zener diode and the silicon controller rectifier (SCR) (please refer to FIG. 3), and the suitable protecting point of the feedback current signal $V_{fN}$ is set inside the IC. The span-voltage of the divided-voltage resistor is increased with the temperature of the switch element. When the temperature of the switch element is increased to the definite level, the span-voltage of the divided-voltage is higher than the breakage voltage of the zener diode. The silicon controlled rectifier is triggered to be turned on for rising the feedback current signal enormously over the protecting point, and then the switch element is turned off.

On the other hand, the area control signal of the control IC 200 of the area control driving circuit transmitted from the control center 700 determines the turn-on time of the gate electrode driving circuit ($G_0$, $G_1$ . . . and $G_{N-1}$). The brightness of each LED array can be modulated individually to achieve the effect of the area control by the pulse width modulation (PWM) control. When the block numbers of the area of the sectionalized screen are more than the channel numbers of the area control IC 200, the backlight source is sectionalized into the block numbers of the area by the user's demand by the pin SPO of the area control IC 200. The method is described below.

Since N digital data can only be read by the buffer register 230, when the control center 700 is inputted a digital signal data more than N to the serial port interface digital signal input port SPI of the control IC 200 of the first area control driving current, the data behind the N+1 one is outputted from the serial port interface digital signal output port SPO of the control IC 200 of the first control driving circuit. The signal is linked to the pin SPI of the control IC 200 of the second area control driving circuit, and the data is entered to the buffer register 230 of the control IC 200 of the second area control driving circuit. The feedback current signals ($V_{fN}$, $V_{fN+1}$ . . . ) behind the N+1 one are transmitted to the feedback current signal input ports ($V_{F0}$, $F_{f1}$ . . . ) of the control IC 200 of the second area control driving circuit; therefore, the active power switch driving signals ($G_0$, $G_1$ . . . ) of the control IC 200 of the second area control driving circuit are linked to the active power switches ($S_N$, $S_{N+1}$ . . . ) behind the N one for achieving the function of the area control. The block numbers of the area of the backlight source are increased by the usage of the output port SPO, and are not restricted by the channel numbers of the control IC 200 of the area control driving circuit.

According to the abovementioned description, it is known that the control IC 200 of the area control driving circuit of the present invention can be applied in the area control circuit of the single-set driver. The currents of each LED array can be controlled accurately, and the control IC can be cooperated with every LED brand. The larger freedom can be achieved by the systematic designer in the aspect of the material. At the same time, the breakage of whole white light LED array is not worried due to the different LED impedance or the too high driving current made by the LED breakage.

Figure 4A:
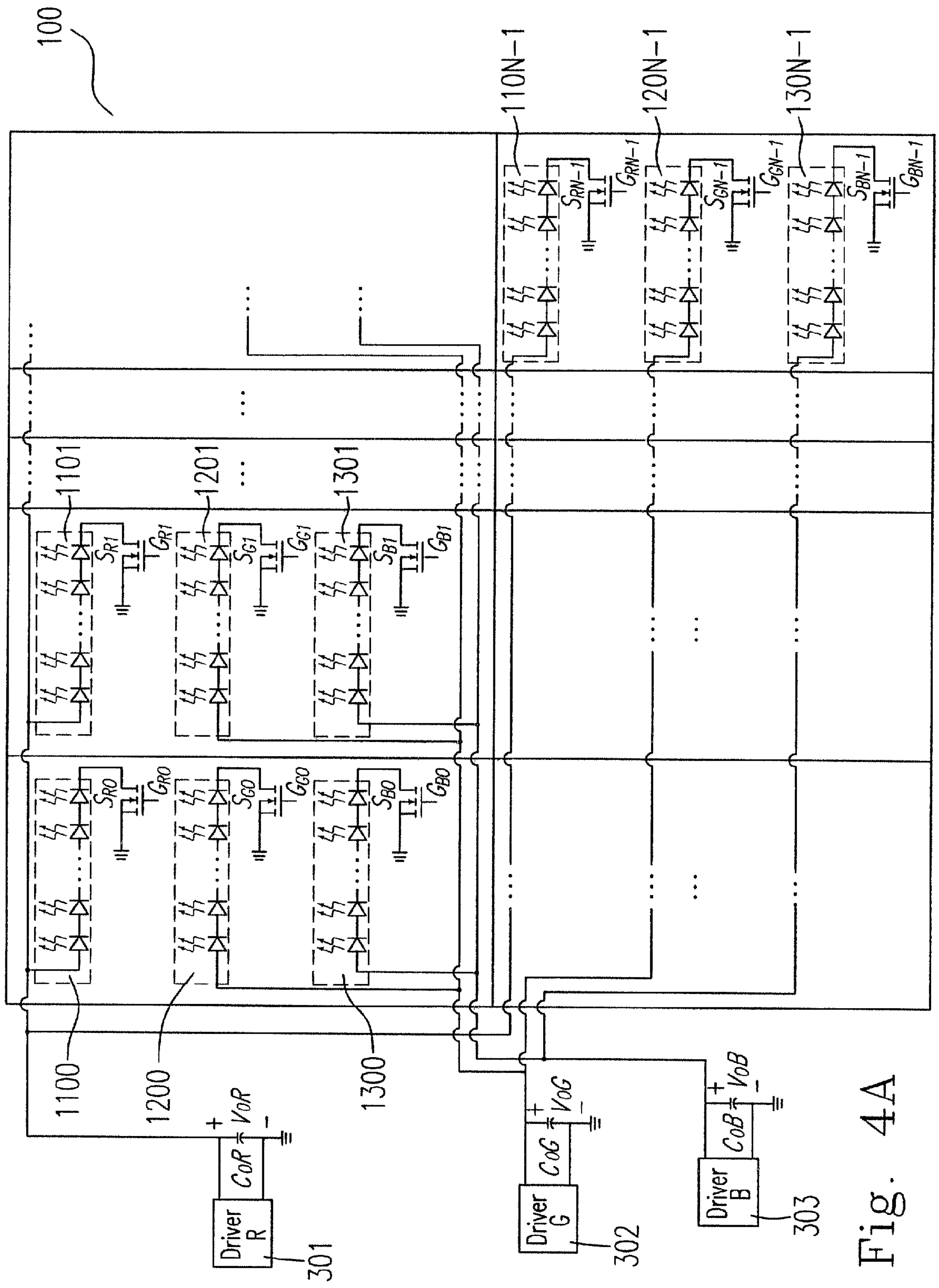
FIG. 4 is a circuit diagram showing an area control driving circuit of the red, green and blue LED backlight lamps according to the present invention.
Figure 4B:
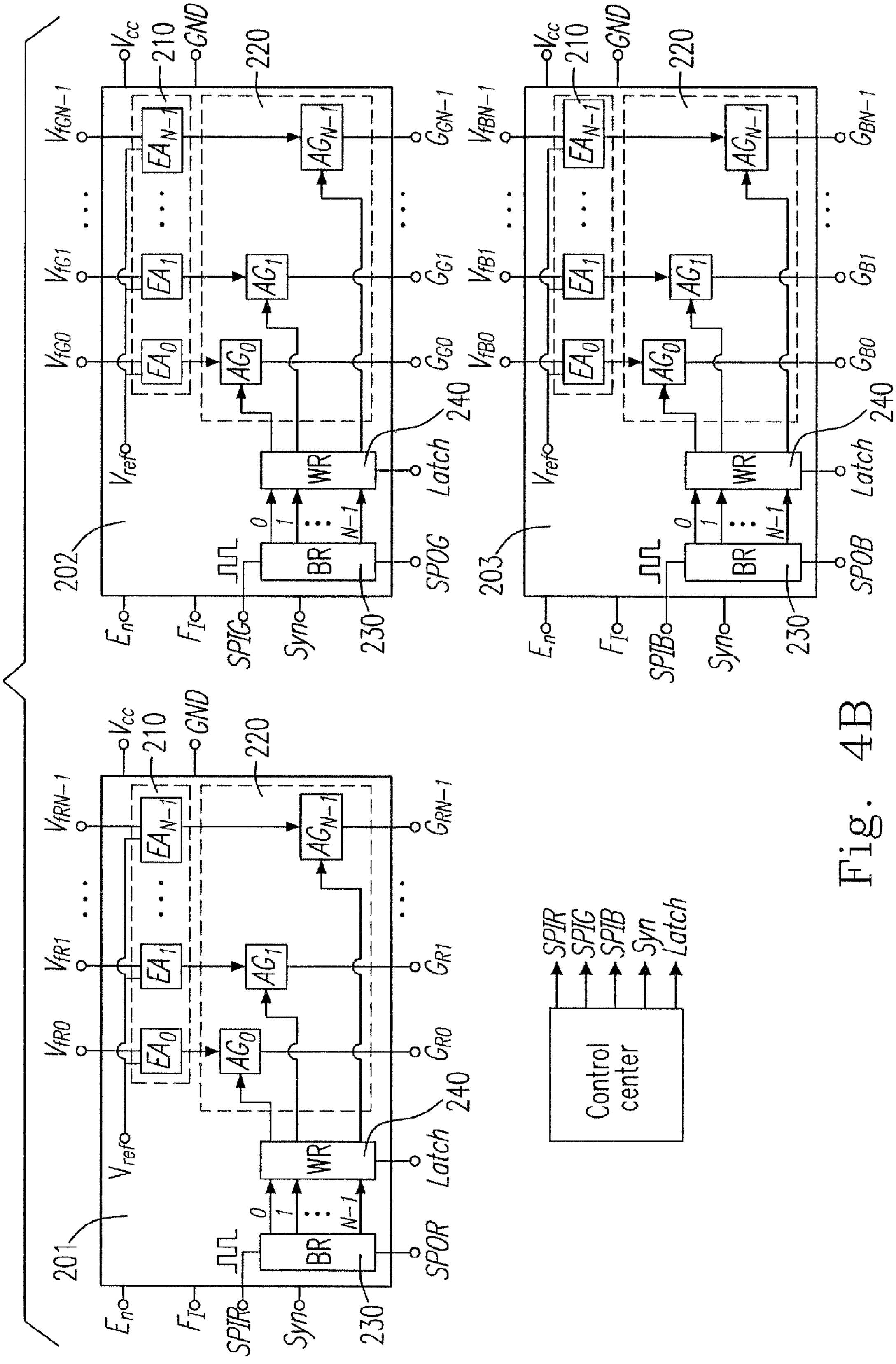

The control IC 200 of the area control driving circuit of the present invention is also cooperated with the red, green and blue LED backlight lamps and the LED backlight lamp of the sequential color display method. Please refer to FIG. 4, which is a circuit diagram showing an area control driving circuit of the red, green and blue LED backlight lamps according to the present invention. The driving system is configured by the backlight module 100, the control center 700, the control ICs (201, 202 and 203) of the area control driving circuit, driver 301 (driver R), driver 302 (driver G) and driver 303 (driver B), wherein the control center 700 outputs a red serial digital signal to a red serial port interface digital signal input port SPIR of the control ICs (201 to 203) of each area control driving circuit, a green serial digital signal to a green serial port interface digital signal input port SPIG of the control ICs (201 to 203) of each area control driving circuit, a blue serial digital signal to a blue serial port interface digital signal input port SPIB of the control ICs (201 to 203) of each area control driving circuit, a synchronizing signal to a synchronizing signal input port Syn of the control ICs (201 to 203) of the area control driving circuit, and a trigger signal to a trigger signal input port Latch of the control ICs (201 to 203) of the area control driving circuit. The backlight module 100 is sectionalized into N areas, the backlight lamps in each area are configured by the LED arrays (the red light LED arrays: 1100, 1101 . . . and 110N−1, the green light LED arrays: 1200, 1201 . . . and 120N−1, and the blue light LED arrays: 1300, 1301 . . . and 130N−1) and the power switches (including $S_{R0}$ to $S_{RN}$, $S_{G0}$ to $S_{GN}$, and $S_{B0}$ to $S_{BN}$). The red, green and blue light LED arrays are controlled by the control ICs (201, 202 and 203) of the area control driving circuit respectively, and the inside circuits and the operation principle are identical with the control IC 200 of the area control driving circuit.

Figure 5A:
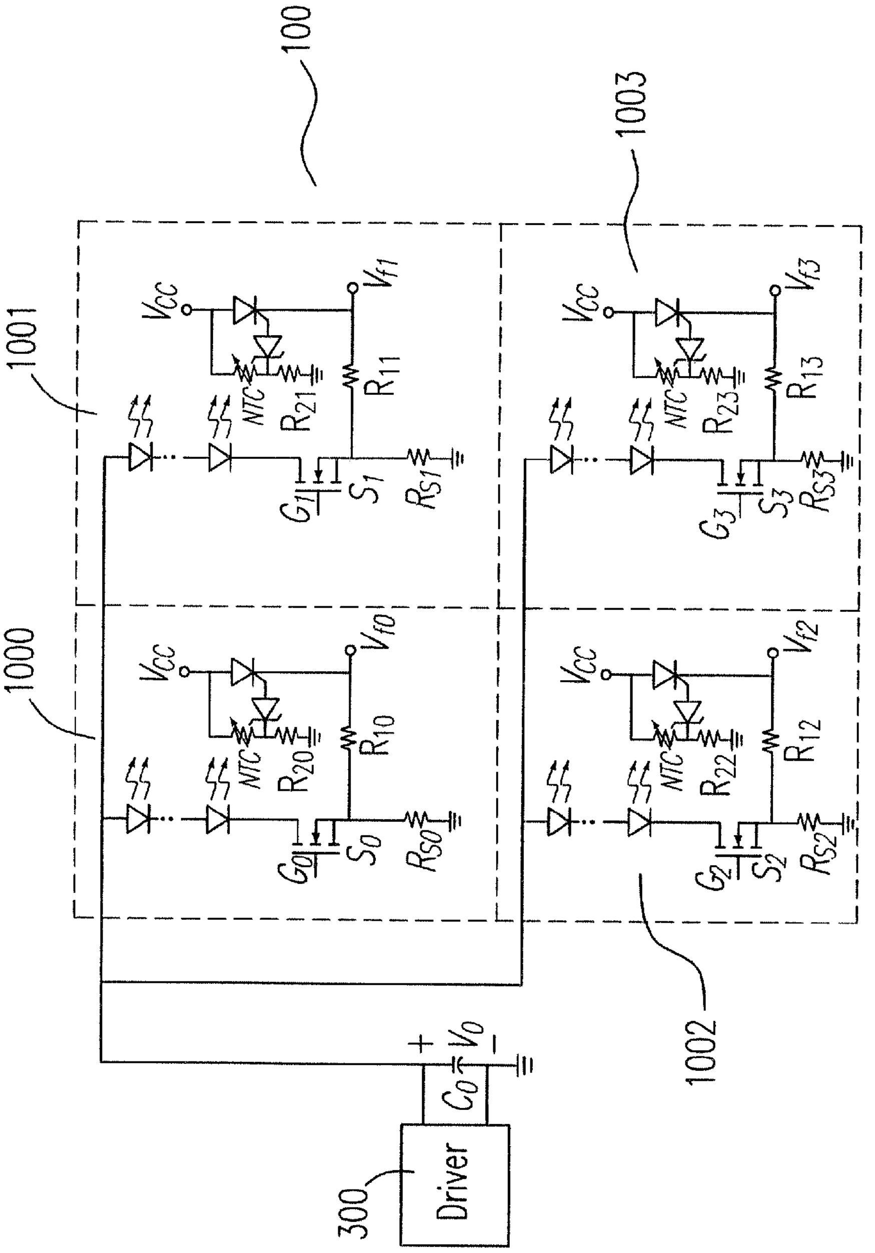
FIG. 5 is a partial circuit diagram showing an area control driving circuit of the white light LED backlight lamp in accordance with a first preferred embodiment of the present invention.
Figure 5B:
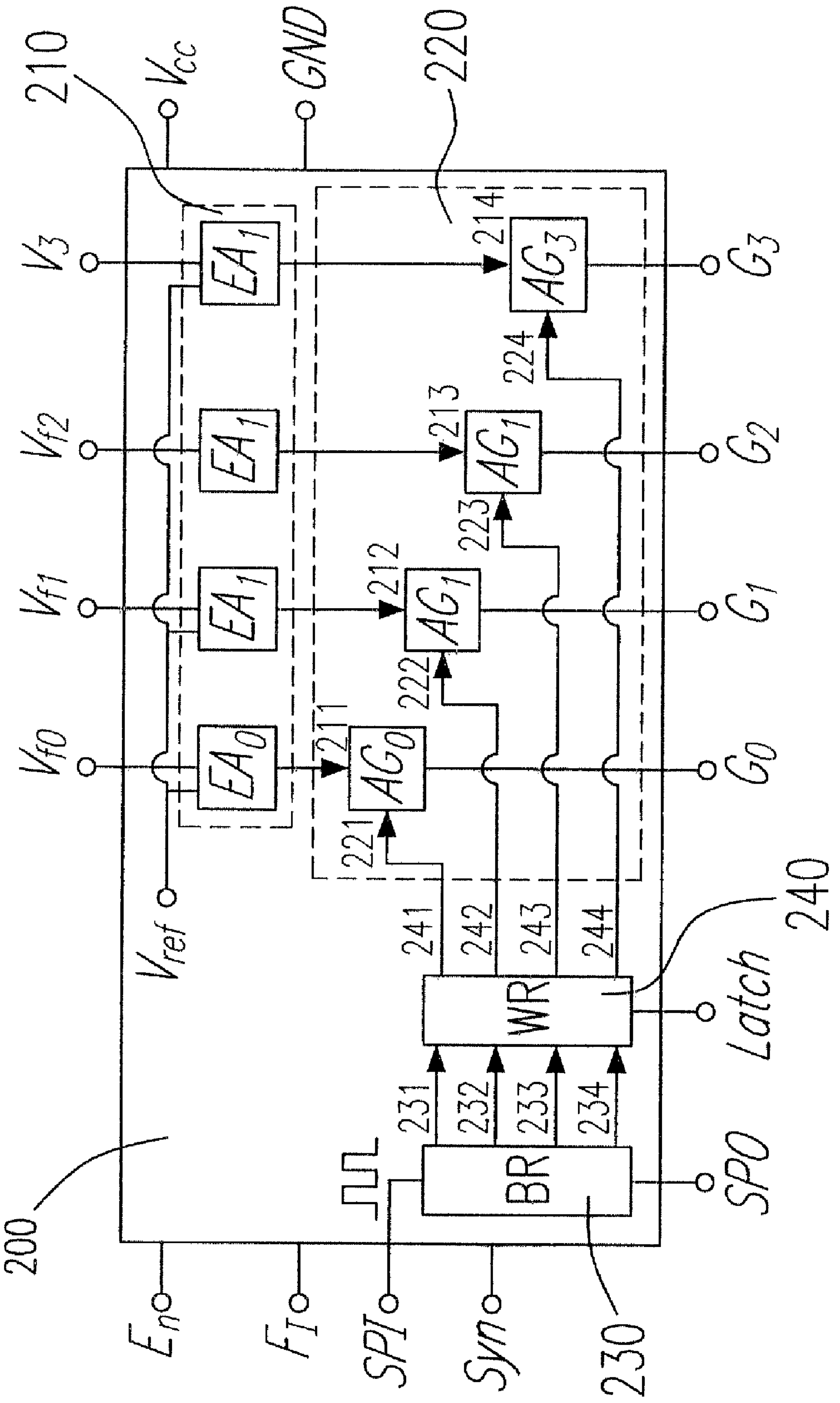

Please refer to FIG. 5, which is a partial circuit diagram showing an area control driving circuit of the white light LED backlight lamp in accordance with a first preferred embodiment of the present invention, and the circuit framework of four channels is the example herein. The driving circuit includes one driver 300, four white light LED arrays (1000, 1001, 1002 and 1003), four active switches ($S_0$, $S_1$, $S_2$ and $S_3$), and four current detecting resistors ($R_{S0}$, $R_{S1}$, $R_{S2}$ and $R_{S3}$). Four output driving signals ($G_0$, $G_1$, $G_2$ and $G_3$) of the control IC 200 of the area control driving circuit respectively are provided to the gate electrode driving signals of the active power switches ($S_0$, $S_1$, $S_2$ and $S_3$).

Figure 6A:
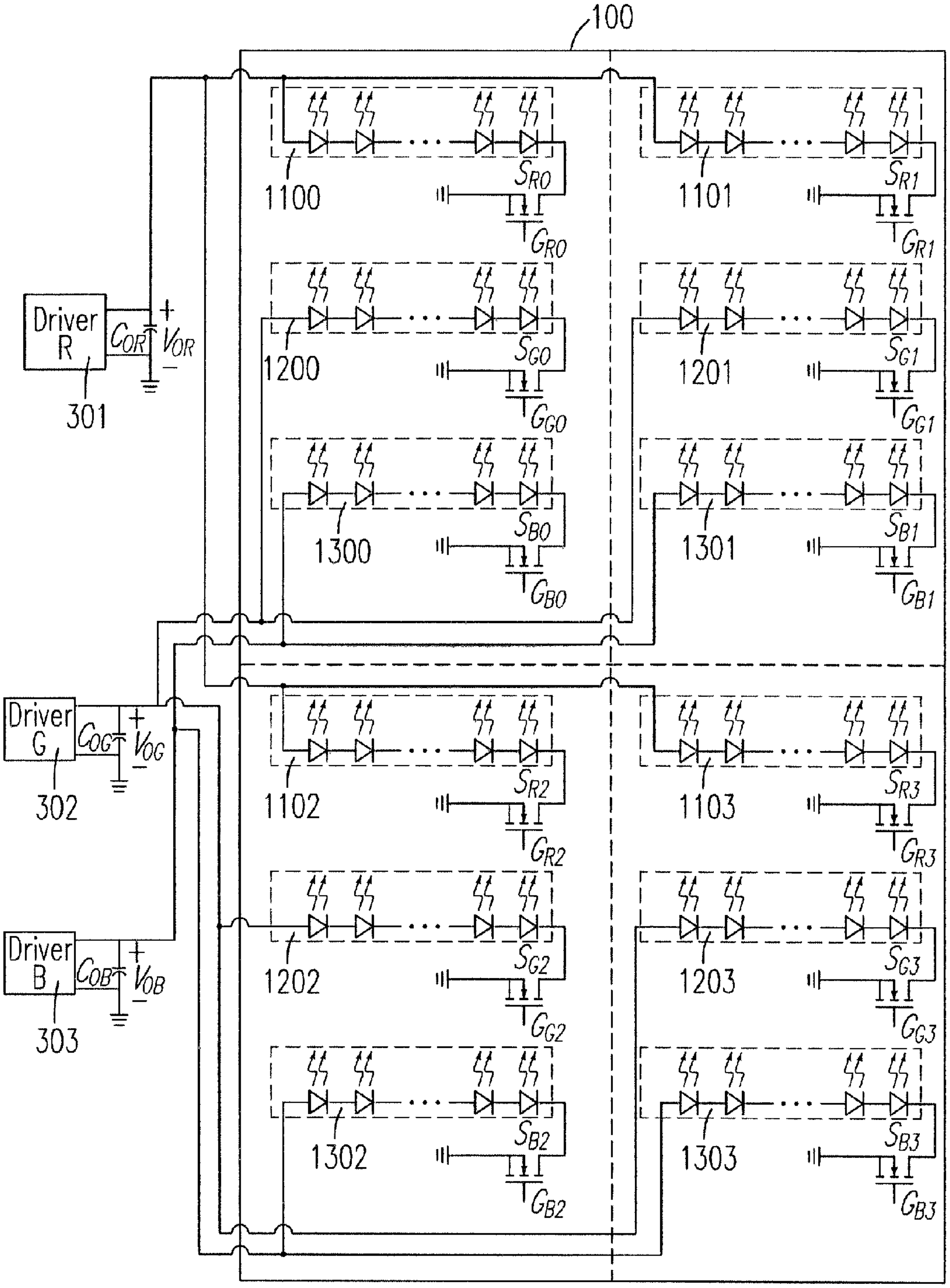
FIG. 6 is a partial circuit diagram showing an area control driving circuit of the red, green and blue LED backlight lamps in accordance with a second preferred embodiment of the present invention.
Figure 6B:
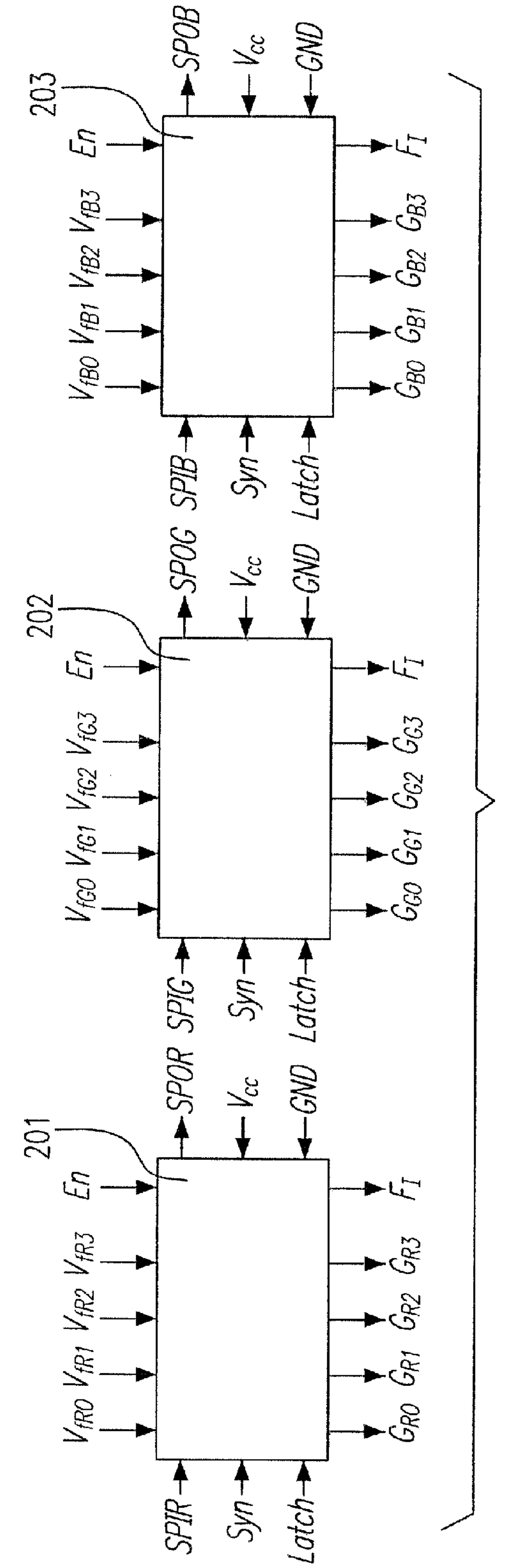

The second preferred embodiment of the present invention is adapted to the control IC of the area control driving circuit of the red, green, and blue LED backlight lamps. Please refer to FIG. 6, which is a partial circuit diagram showing an area control driving circuit of the red, green and blue LED backlight lamps in accordance with a second preferred embodiment of the present invention. The driving circuit includes three drivers (301, 302 and 303), four red light LED arrays (1100, 1101, 1102 and 1103), four green light LED arrays (1200, 1201, 1202 and 1203), four blue light LED arrays (1300, 1301, 1302 and 1303), four red light active power switches ($S_{R0}$, $S_{R1}$, $S_{R2}$ and $S_{R3}$), four green light active power switches ($S_{G0}$, $S_{G1}$, $S_{G2}$ and $S_{G3}$), four blue light active power switches ($S_{B0}$, $S_{B1}$, $S_{B2}$ and $S_{B3}$), and three control ICs (201 to 203) of the area control driving circuit.

Among these, four output driving signals ($G_{R0}$, $G_{R1}$, $G_{R2}$ and $G_{R3}$) of the control IC 201 of the area control driving circuit respectively are provided to the gate electrode driving signals of the red light active power switches ($S_{R0}$, $S_{R1}$, $S_{R2}$ and $S_{R3}$) for driving the red light LED arrays, four output driving signals ($G_{G0}$, $G_{G1}$, $G_{G2}$ and $G_{G3}$) of the control IC 202 of the area control driving circuit respectively are provided to the gate electrode driving signals of the green light active power switches ($S_{G0}$, $S_{G1}$, $S_{G2}$ and $S_{G3}$) for driving the green light LED arrays, and four output driving signals ($G_{B0}$, $G_{B1}$, $G_{B2}$ and $G_{B3}$) of the control IC 203 of the area control driving circuit are provided to the gate electrode driving signals of the blue light active power switches ($S_{B0}$, $S_{B1}$, $S_{B2}$ and $S_{B3}$) for driving the blue light LED arrays. All of the operation principles are identical to the driving IC 200.

Figure 7A:
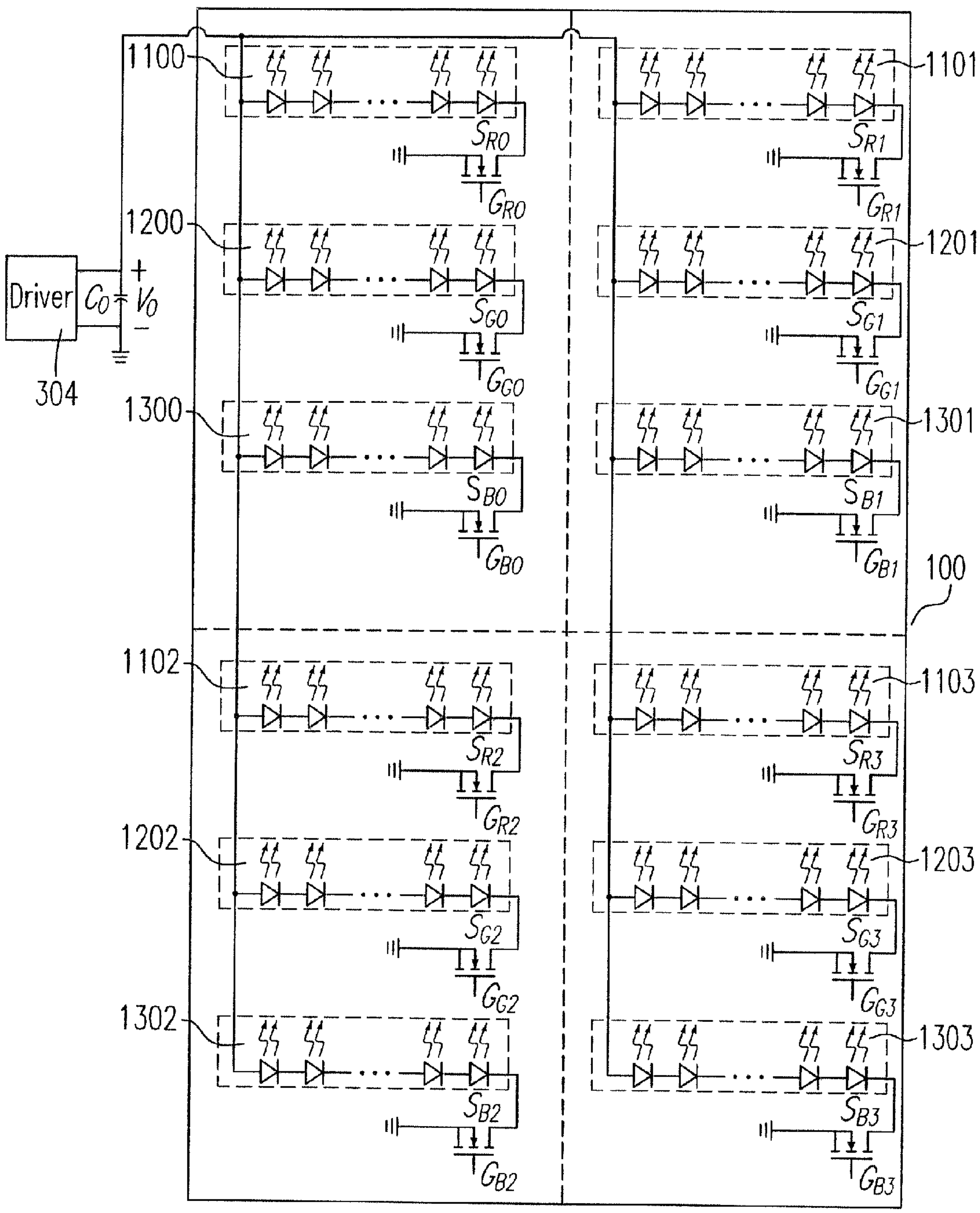
FIG. 7 is a partial circuit diagram showing an area control driving circuit of the LED backlight of the sequential color display method in accordance with a third preferred embodiment of the present invention.
Figure 7B:
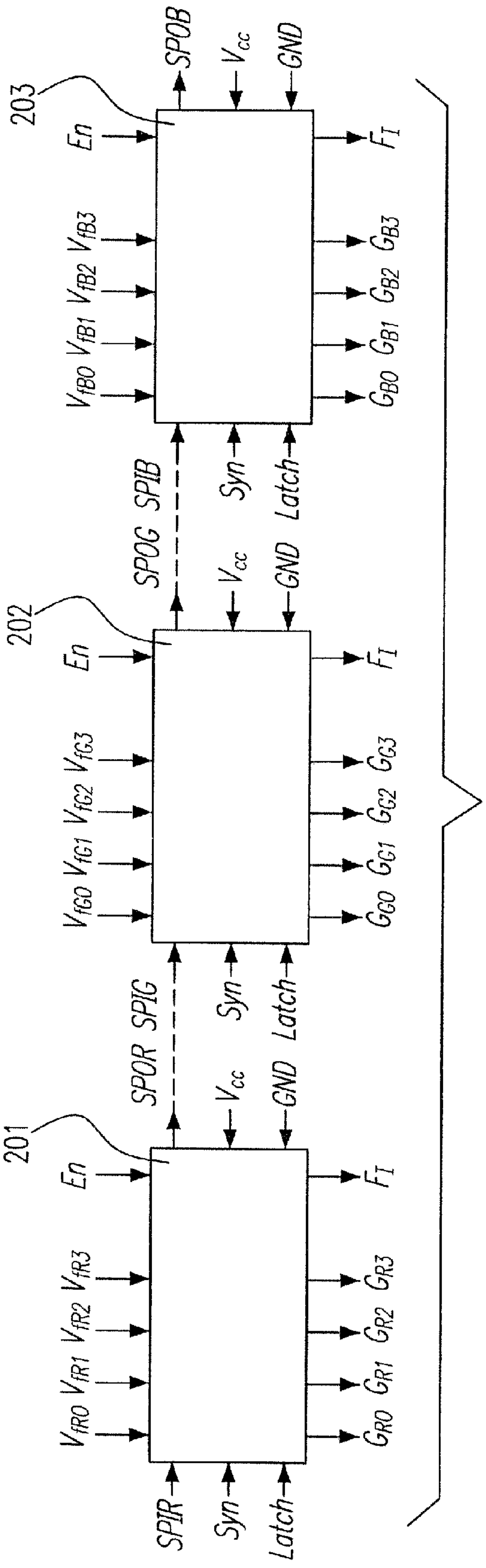

The third preferred embodiment of the prevent invention is adapted to the backlight lamp area control IC of the red, green and blue light LED of the sequential color display method. In the display technology of sequential color display method, the driver is changed from original three sets to one set, and the cost, weight and volume of the driver are decreased enormously. Please refer to FIG. 7, which is a partial circuit diagram showing an area control driving circuit of the LED backlight of the sequential color display method in accordance with a third preferred embodiment of the present invention. The driving circuit includes one driver 304, four red light LED arrays (1100, 1101, 1102 and 1103), four green light LED arrays (1200, 1201, 1202 and 1203), four blue light LED arrays (1300, 1301, 1302 and 1303), four red light active power switches ($S_{R0}$, $S_{R1}$, $S_{R2}$ and $S_{R3}$), four green light active power switches ($S_{G0}$, $S_{G1}$, $S_{G2}$ and $S_{G3}$), and four blue light active power switches ($S_{B0}$, $S_{B1}$, $S_{B2}$ and $S_{B3}$). In the area control circuit of the sequential color display method, the turn-on time of the LED array needed is determined by the control center 700 provided to the digital signals (SPIR, SPIG and SPIB) of the area control ICs (201, 202 and 203).

According to the abovementioned description, an IC of the area control driving circuit of the LED backlight lamp is provided in the present invention, and is cooperated with different LED arrays to achieve the effects of the area control and stabling the circuit. The IC of the present invention can be cooperated with the single-set white light LED backlight lamp, the white light backlight lamp mixing with the red, green and blue lights, and the LED backlight lamp of the sequential color display method. The present invention includes novelty, non-obviousness and industrial usefulness; therefore, the patent application of the present invention is applied.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A control circuit of a driving circuit for controlling a light emitting diode (LED) light source having a plurality of areas, comprising:

a plurality of error amplifiers, each of which receives a feedback current signal outputted from a specific area of the light source and an external reference voltage for generating an error signal;

a buffer register receiving a serial digital signal, and generating a plurality of parallel digital signals;

a work register receiving the plurality of parallel digital signals and a trigger signal, and outputting the plurality of parallel digital signals when the trigger signal is at a relatively high level; and a switch module having a plurality of power switches and coupled to the work register, each of the power switches receives a specific one of the error signals and a specific one of the parallel digital signals for generating a driving signal to control a driving current of a specific area of the light source, in order to control the brightness in each area of the LED light source, wherein the light source is a backlight module, and the driving circuit further comprises a control center generating the serial digital signal a driver generating the driving current, and an LED array module having a plurality of LED arrays, each of which comprises:

an LED series having a plurality of LEDs, a first end coupled to the driver and a second end;

an active power switch controlling a current of the LED series and comprising:

a first end coupled to the second end of the LED series;

a second end; and a control end receiving a specific one of the driving signals;

a current detecting resistor detecting a standard value of a specific one of the driving currents passing through the LED series, comprising a first end coupled to the second end of the active power switch, and a second end coupled to a ground;

an active switch protecting circuit comprising:

a first voltage-divided resistor having a first end coupled to the first end of the current detecting resistor and a second end outputting a specific one of the feedback current signals;

a silicon controlled rectifier (SCR) having an anode receiving a power voltage, a cathode coupled to the second end of the first voltage-divided resistor and a gate electrode;

a zener diode having an anode coupled to the gate electrode of the silicon controlled rectifier and a cathode;

a negative temperature coefficient (NTC) resistor having a first end coupled to the anode of the silicon controlled rectifier and a second end coupled to the cathode of the zener diode; and a second voltage-divided resistor having a first end coupled to the cathode of the zener diode and a second end coupled to the ground, wherein when a temperature of the active power switch is higher than a predetermined temperature, the active power switch will be turned off, and each of the driving currents drives a specific one of the areas of the light source for emitting a light.

2. The control circuit of claim 1, wherein the switch module is an analog switch module.

3. The control circuit of claim 1, wherein the backlight module is selected from a group consisting of a single-set white light LED backlight lamp, an LED backlight lamp comprising a red, a green and a blue backlight lamps, and an LED backlight lamp of a sequential color display method.

4. The control circuit of claim 1, wherein the control circuit is an integrated circuit controlling the LED light source, and further comprises:

a plurality of feedback current signal input ports, each of which receives a specific feedback current signal;

a reference voltage input port receiving a reference voltage;

an enable signal input port receiving an enable signal;

an alarm signal output port outputting an alarm signal indicating a failure;

a serial bus interface digital signal input port receiving the serial digital signal;

a synchronizing signal input port receiving a synchronizing signal synchronizing the light source and the control circuit;

a serial bus interface digital signal output port outputting a datum from the digital signal output port when a number of the datum inputted into the serial bus interface digital signal output port is larger than a predetermined value;

a trigger signal input port receiving the trigger signal;

a plurality of driving signal output ports, each of which outputs a specific driving signal of the active power switch;

a grounding port coupled to a ground; and a voltage input port receiving a supply voltage.

5. The control circuit of claim 1, wherein each of the power switches is an analog gate switch.

6. A control circuit of a driving circuit for controlling an LED light source having a plurality of areas, comprising:

a buffer register receiving a serial digital signal outputted from the driving circuit for generating a plurality of parallel digital signals;

a work register receiving the plurality of parallel digital signals and a trigger signal, and outputting the plurality of parallel digital signals when the trigger signal is at a relatively high level; and an error amplifier module receiving a plurality of feedback current signals outputted from the respective areas of the light source and an external reference voltage for generating a plurality of driving signals, in order to control a brightness in each area of the LED light source, the module comprising:

an error amplifier receiving a specific one of the feedback current signals and the reference voltage for generating an error signal; and a switch coupled to the work register and receiving the error signal and a specific one of the parallel digital signals for generating the driving signal, wherein the light source is a backlight module, and the driving circuit further comprises a control center generating the serial digital signal, a driver generating the driving current, and an LED array module having a plurality of LED arrays, each of which comprises:

an LED series having a plurality of LEDs, a first end coupled to the driver and a second end;

an active power switch controlling a current of the LED series and comprising:

a first end coupled to the second end of the LED series;

a second end; and a control end receiving a specific one of the driving signals;

a current detecting resistor detecting a standard value of a specific one of the driving currents passing through the LED series, comprising a first end coupled to the second end of the active power switch, and a second end coupled to a ground;

an active switch protecting circuit comprising:

a first voltage-divided resistor having a first end coupled to the first end of the current detecting resistor and a second end outputting a specific one of the feedback current signals;

a silicon controlled rectifier (SCR) having an anode receiving a power voltage, a cathode coupled to the second end of the first voltage-divided resistor and a gate electrode;

a zener diode having an anode coupled to the gate electrode of the silicon controlled rectifier and a cathode;

a negative temperature coefficient (NTC) resistor having a first end coupled to the anode of the silicon controlled rectifier and a second end coupled to the cathode of the zener diode; and a second voltage-divided resistor having a first end coupled to the cathode of the zener diode and a second end coupled to the around, wherein when a temperature of the active power switch is higher than a predetermined temperature, the active power switch will be turned off, and each of the driving currents drives a specific one of the areas of the light source for emitting a light.

* * * * *